Patented Aug. 14, 1951

2,564,243

UNITED STATES PATENT OFFICE 2,564,243

AZO DYESTUFFS

Walter Francis Beech and Mordecai Mendoza, Blackley, Manchester, England, assignors to Imperial Chemical Industries Limited, a corporation of Great Britain No Drawing. Application December 29, 1947, Serial No. 794,432. In Great Britain December 30, 1946

3 Claims. (Cl. 260—198)

This invention relates to new azo dyestuffs and more particularly to new azo dyestuffs suitable for dyeing wool by the metachrome process.

In British Patent No. 347,288 it was proposed to make azo dyestuffs by coupling an aromatic diazo compound with an amino-hydroxynaphthalene containing one or more unsubstituted or substituted sulphamino residues or a derivative or substitution product thereof, and there was described the preparation of dyestuffs by coupling diazotised 2-aminophenol-4-sulphonic acid or other diazotised o-aminophenol-sulphonic acids such as the chloro- or nitro-derivatives with 1-amino -8- hydroxynapthalene-3:6-(sulphanilide) or the corresponding N-methyl- or N-ethyl-anilides. These latter dyestuffs were said to give fast greenish blue shades by the afterchroming process on wool.

We have now found that when 4-nitro-2-aminophenol-6-sulphonic acid is used as the diazo component and in place of 1-amino-8-hydroxynaphthalene-3:6-di-(sulphanilide) as coupling component there is used a 1-amino-8-naphthol-3:6-di-(sulphonalkylamide) or a 1-amino-8-naphthol-3:6-di-(sulphondialkylamide) wherein the total number of carbon atoms in the alkyl groups attached to each amide nitrogen atom is 2, 3 or 4, new and valuable azo dyestuffs are obtained which give bluish-green shades of excellent fastness to wet treatments and to light when applied to wool by the afterchrome or metachrome process. We have further found that these new azo dyestuffs give brighter bluish-green shades and better exhaustion when dyed by the metachrome process than previously known dyestuffs derived from aminonaphtholsulphonamides. The new dyestuffs of the present invention are more consistent in tone when applied by the metachrome or afterchrome processes and because of their better solubility they are more closely applied than the previously known dyestuffs derived from aminonaphtholsulphonamides.

According to our invention therefore we provide a process for the manufacture of new azo dyestuffs which comprises coupling in alkaline medium diazotised 4-nitro-2-aminophenol-6-sulphonic acid with a 1-amino-8-naphthol-3:6-di-(sulphonamide) which carries one or two alkyl groups containing a total of 2, 3 or 4 carbon atoms on the nitrogen atom of each sulphonamide group. These new dyestuffs may be represented by the following general structural formula

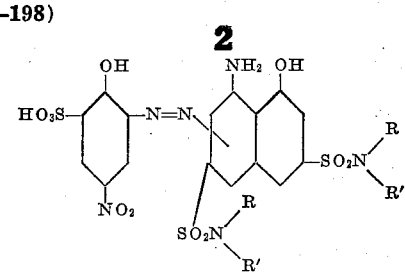

wherein R is a radical selected from the group consisting of hydrogen and 2 to 4 carbon atom alkyl and R' is a 2 to 4 carbon atom alkyl radical.

As examples of coupling components which may be used in the invention there may be mentioned 1-amino -8- naphthol -3:6- di-(sulphonethylamide), 1-amino -8- naphthol-3:6-di-(sulphonisopropylamide), 1 -amino-8-naphthol-3:6-di-(sulphondimethylamide) and 1 - amino- 8 - naphthol - 3:6 - di-(sulphondiethylamide). The coupling components may be prepared by reacting 1-acetylamino-8-naphthol-3:6-disulphonchloride (itself obtained as described in British Patent No. 326,226) with the appropriate primary or secondary base, for example ethylamine, isopropylamine, dimethylamine and diethylamine, and subsequently heating the product with dilute caustic soda solution to remove the acetyl group.

The invention is illustrated but not limited by the following examples in which the parts are by weight.

Example 1

7.46 parts of 1-amino-8-naphthol-3:6-di-(sulphondimethylamide) are dissolved in a solution of 1 part of sodium hydroxide in 120 parts of water. 5 parts of soda ash are added and the solution is cooled to 10° C. A diazo solution, prepared by stirring 4.68 parts of 4-nitro-2-aminophenol-6-sulphonic acid with 60 parts of water and adding 5 parts of 36% hydrochloric acid and 1.4 parts of sodium nitrite dissolved in 10 parts of water, is run in during 10 minutes. The mixture is stirred for 15 hours, and the new dyestuff is filtered off and dried at 50° C. It dyes wool in bluish-green shades by the metachrome process with good exhaustion of the dyebath, the dyeings possessing excellent fastness to all wet treatments and light. The new dyestuff has the following structural formula

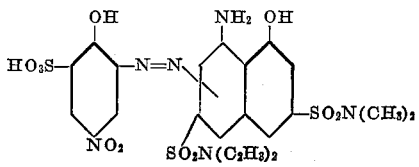

Example 2

In place of the 7.46 parts of 1-amino-8-naphthol-3:6-di-(sulphondimethylamide) used in Example 1, there are used 8.58 parts of 1-amino-8-naphthol-3:6-di-(sulphondiethylamide). A dyestuff similar in properties to that of Example 1 is obtained. It has the following structural formula

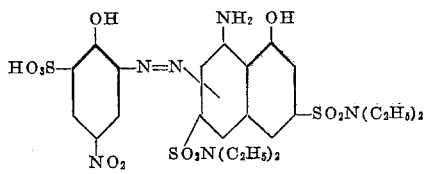

Example 3

In place of the 7.46 parts of 1-amino-8-naphthol - 3:6-di-(sulphondimethylamide) used in Example 1, there are used 7.46 parts of 1-amino-8-naphthol - 3:6-di-(sulphonethylamide). A dyestuff similar in properties to that of Example 1 is obtained.

Example 4

In place of the 7.46 parts of 1-amino-8-naphthol - 3:6-di-(sulphondimethylamide) used in Example 1, there are used 8.02 parts of 1-amino-8-naphthol - 3:6-di-(sulphonisopropylamide). A dyestuff similar in properties to that of Example 1 is obtained.

We claim:

1. Monoazo dyestuffs of clear green shade when chromed and having a high metachrome dyeing efficiency and light-fastness of the general formula:

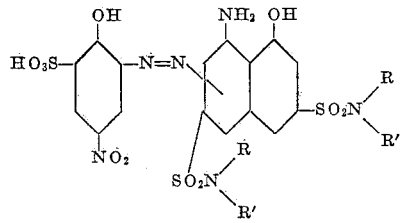

wherein R is a radical selected from the group consisting of hydrogen and 2 to 4 carbon atom alkyl, and R' is a 2 to 4 carbon atom alkyl radical.

2. A monoazo dyestuff of celar green shade when chromed and having a high metachrome dyeing efficiency and light-fastness of the general formula:

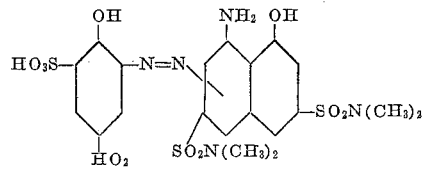

3. A monoazo dyestuff of clear green shade when chromed and having a high metachrome dyeing efficiency and light-fastness of the general formula:

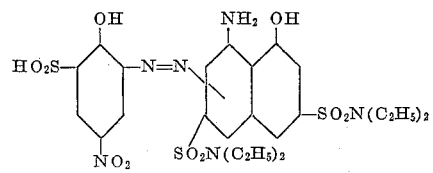

WALTER FRANCIS BEECH.
MORDECAI MENDOZA.

REFERENCES CITED

The following references are of record in the file of this patent:

UNITED STATES PATENTS

| Number | Name | Date |
| --- | --- | --- |
| 727,964 | Kahn | May 12, 1903 |
| 1,903,599 | Schweitzer | Apr. 11, 1933 |
| 2,276,174 | Fleischhaver et al. | Mar. 10, 1942 |
| 2,452,171 | Straub et al. | Oct. 26, 1948 |